United States Patent [19]

Richards, Jr. et al.

[11] Patent Number: 5,027,402
[45] Date of Patent: Jun. 25, 1991

[54] BLEND-ON-NOISE STEREO DECODER

[75] Inventors: Oliver L. Richards, Jr., N. Grosvenor Dale, Conn.; Thomas L. Field, Rutland, Mass.

[73] Assignee: Allegro Microsystems, Inc., Worcester, Mass.

[21] Appl. No.: 455,051

[22] Filed: Dec. 22, 1989

[51] Int. Cl.⁵ .............................................. H04H 5/00
[52] U.S. Cl. .......................................... 381/10; 381/13
[58] Field of Search ...................................... 381/10, 13

[56] References Cited

U.S. PATENT DOCUMENTS

| | | | |
|---|---|---|---|
| 3,602,380 | 7/1986 | Stebbings | 381/13 |
| 3,603,890 | 9/1971 | Camenzind | 329/101 |
| 4,037,056 | 7/1977 | Ienaka et al. | 179/15 |
| 4,074,075 | 2/1978 | Oshawa | 179/15 |
| 4,390,749 | 6/1983 | Pearson | 381/10 |
| 4,466,115 | 8/1984 | Hashimoto | 381/11 |
| 4,817,151 | 3/1989 | Bod et al. | 381/10 |

FOREIGN PATENT DOCUMENTS 58-95444  6/1983  Japan ..................................... 381/13

OTHER PUBLICATIONS

Takahashi and Iida, "Application of Walsh Functions to an FM Stereo Demodulator," J. Audio Eng. Soc., vol. 33, No. 9, Sep. 1985, pp. 669-673.

Primary Examiner—Jin F. Ng
Assistant Examiner—Sylvia Chen

[57] ABSTRACT

An FM stereo decoding and separating circuit has an (AM) demodulator multiplier to which is connected the FM stereo composite signal and a signal of dominant frequency equal to and in phase (0°) with respect to the pilot signal for retrieving the L−R signal from the composite signal. This demodulator also has a blend control circuit for diminishing the magnitude of the L−R signal as a function of a blend control voltage that may be applied to the input of the blend control circuit. The decoding circuit also includes a special multiplier to which is connected the FM stereo composite signal and a signal of dominant frequency equal to that of the 38 KHz subcarrier but shifted 90° with respect to the phase of the pilot, for AM demodulating the composite signal with respect to the subcarrier, and a low pass filter connected to the special mixer output for producing an output containing only demodulated noise originally appearing about the pilot in the composite signal, and a rectifier connected to the filter output and to the blend-control input for effecting blending to a degree directly related to the amount of noise in a narrow band about the pilot in the composite signal.

8 Claims, 3 Drawing Sheets

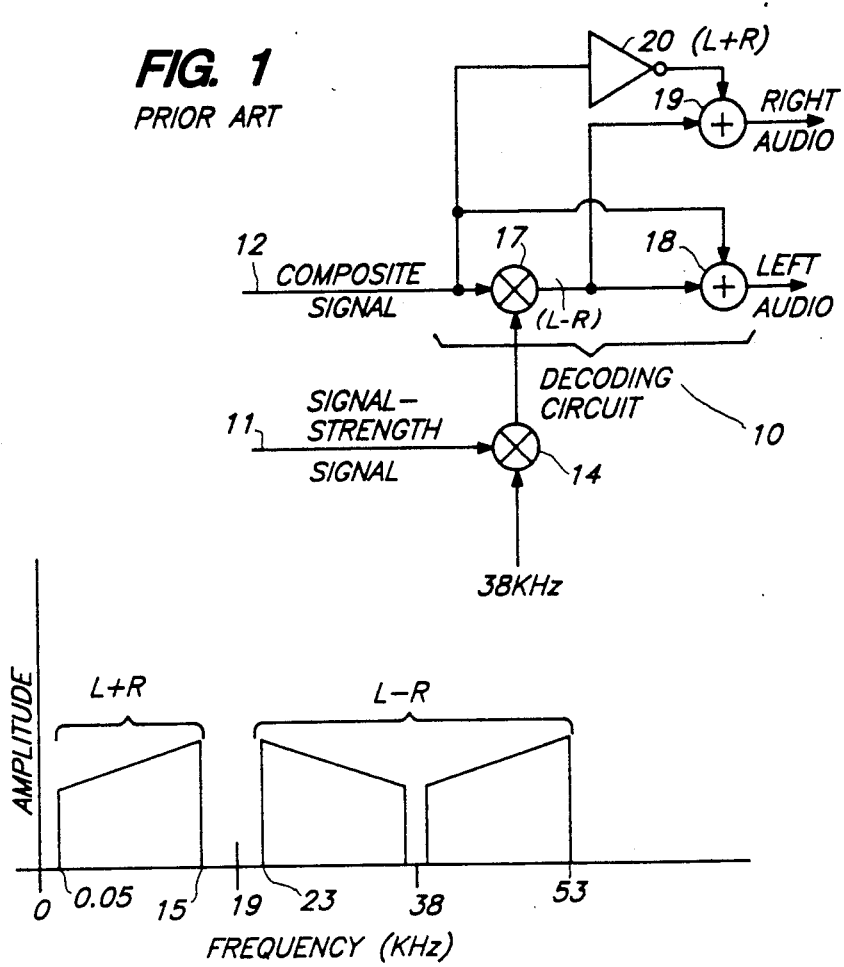
FIG. 1 PRIOR ART
FIG. 2
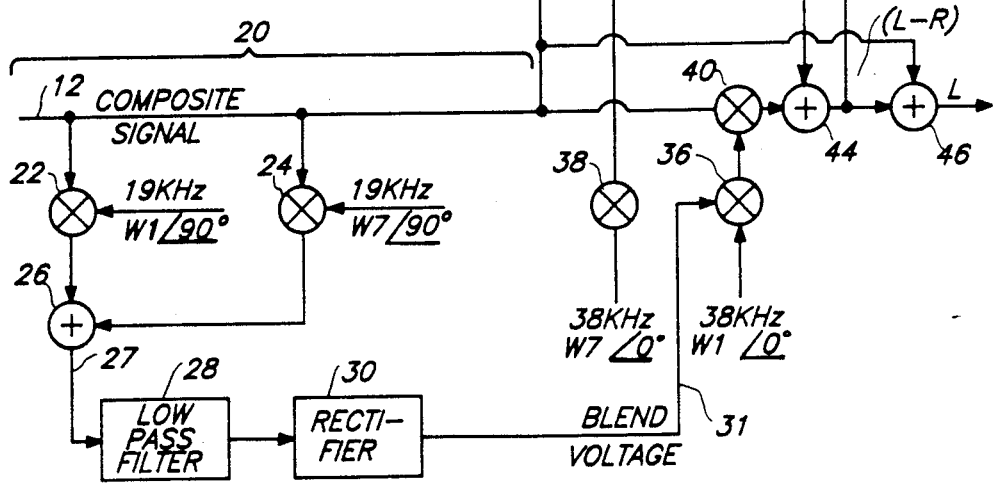
FIG. 3

BLEND-ON-NOISE STEREO DECODER

BACKGROUND OF THE INVENTION

This invention relates to stereo blend circuits in FM stereo receivers and more particularly relates to such a blend circuit that blends and reduces stereo separation as a direct function of noise in the composite stereo signal.

Stereo blending in a conventional FM receiver is accomplished by reducing stereo separation inversely with the FM signal strength as detected in the IF or RF section of the receiver. One means of accomplishing this is indicated by the decoder 10 shown in FIG. 1. The 38 KHz restored sub-carrier signal and the output of the signal strength detector circuit at conductor 11 to be used as a blend-control voltage are applied to the two inputs respectively of a multiplier 14 that serves as a voltage controlled attenuator of the 38 KHz signal. The output of mixer 14 and the stereo composite signal at conductor 12 are mixed to demodulate the composite signal and especially to produce the demodulated L−R portion of the composite signal. That demodulated L−R portion signal is mixed with the non phase shifted composite signal in the summer 18 to produce the left audio signal, while the demodulated L−R portion signal is mixed with the 180° phase shifted composite signal in adder 19 to produce the inverted right audio signal. Another inverter (not shown) may be added in the right audio or left audio outputs if wanted to prevent the occurrence of acoustic canceling, especially at low frequencies, by the right and left signal driven speakers.

Shortcomings of blending decoders of this type stem from the fact that the FM signal strength does not correlate well with the noise appearing in the stereo composite signal. Furthermore, objectionable distortion in the stereo audio signals resulting from receiving the FM radio signal from an FM broadcasting station via two or more paths, a condition commonly referred to as "multipath" reception, is not greatly ameliorated by conventional blending circuits.

Decoders that blend inversely with the FM signal strength are typically designed to fully blend to monaural when the signal to noise ratio falls below about 50 db at which it is considered that the signal strength is low enough for multipath conditions to become less noticeable. However, fully separated stereo receiver operation could have been enjoyed under most other (than multipath) conditions with signal to noise ratios between 50 and 40 db, pointing up the necessity of serious compromise in conventional decoders that blend inversely with signal strength.

In a car radio, multipath reception, varies as the car moves relative to the transmitting station and relative to the terrain containing hills, buildings and other objects that variously reflect the transmitted radio signal and create changing multiple paths to the receiver. Multipath reception is therefore particularly objectionable in a moving stereo FM receiver.

Engineers have presented conflicting theories and empirical data relating to mechanisms by which FM-receiver audible noise is generated. In a paper by Ruckenwald and Torick entitled *FMX Mobile Reception*, IEEE Transactions on Consumer Electronics, Vol. 34 No. 4, pp. 921-8, November 1988, it is shown that multipath noise is suitably diminished by automatically disabling the expander in an FMX receiver. But in a paper by Bose and Short entitled *A Theoretical and Experimental Study of Noise and Distortion in the Reception of FM Signals*, RLE Technical Report No. 540, M.I.T., January 1989, it is concluded that "FMX" reception is inherently more susceptible to multipath noise and that the best remedy is conventional FM reception with a stereo blending capability.

"FMX" and "FMX Stereo" are TRADEMARKS of Broadcast Technology Partners of Bloomfield Hills, Mich., which company has proposed the FMX transmission system in which the standard FM composite signal includes in addition to the usual L−R base band of the suppressed 38 KHz/0° subcarrier, a L−R base band of the quad subcarrier, 38 KHz/90°. The FMX receiver retrieves and expands both for presentation to the receiver dematrixer circuit. This system is described in the Torrick et al U.S. Pat. No. 4,485,483, issued Nov. 27, 1984.

It is therefore an object of this invention to provide an FM stereo blending decoder that is more responsive to radio noise in the composite signal and that substantially reduces audio signal distortion during fixed or varying multipath conditions.

SUMMARY OF THE INVENTION

An FM stereo decoder includes a conductor on which a composite signal is generated, e.g. from an FM radio discriminator, a sub-carrier generating circuit, and a stereo decoding circuit to which composite signal conductor and the sub-carrier are connected for decoding the composite signal and separating the left and right audio components in the composite signal to a left and right audio signal conductor, respectively. The decoding circuit has a blend-control input and is adapted for changing the degree of the separation of left and right signals as a function of the signal level applied to the blend-control input. There is additionally included a blend signal means connected to the composite signal conductor and blend control input for producing at the blend control input a blend control signal that is a function of the magnitude of the noise that is present in a narrow band of the composite signal centered about the pilot signal to effect reduction of the degree of stereo separation effected by the decoder circuit.

The blend signal means may be comprised of a generating means for generating a first signal at the same dominant frequency as that of the pilot signal; a mixer to which the first signal and the composite signal are introduced for AM demodulating the composite signal relative to pilot frequency; a low pass filter having an input connected to the mixer output, and a rectifier means connected to the output of the low pass filter and having an output connected to the blend-control input for effecting blending in the decoder to a degree that is directly related to the amount of noise in the composite signal adjacent the pilot frequency.

This invention recognizes that the region about the pilot signal is the only region in the FM stereo radio composite signal frequency spectrum in which signal tranmissions of any kind are forbidden by law and therefore this is a region in which a measure of noise may be taken that is uniquely free of transmitted signals.

It is further recognized that the detection of noise in this unique narrow region can best be done by mixing the composite signal with a quadratum signal of the pilot signal frequency and 90° out of phase with the pilot signal so as to eliminate the pilot from that demodulation product.

It is additionally recognized that demodulated product may be passed through a low cost four pole low pass filter circuit of only a moderately steep cutoff for passing only the demodulated noise without portions of the demodulation product generated by the L+R and L−R portions of the composite signal spectrum.

It is yet further recognized that the use of square wave Walsh function signals in the L−R decoder mixers (at 38 KHz in an FM radio receiver) and as well in the noise-detector-mixer (at pilot frequency) are important in combination with the blend on noise features of this invention to realize blending on noise only when needed due to high noise or multipath conditions, without the expensive generation of sine signals to avoid generating unwanted demodulation products in both the noise detecting and the stereo decoding and separating circuits; and that generation of the needed Walsh functions is especially economical in that all such Walsh functions may be generated from one phase-locked-loop voltage-controlled oscillator followed by simple frequency dividers and exclusive-or circuits; and furthermore the entire decoder with the exception of a few capacitors is readily amenable to integration.

BRIEF DESCRIPTION OF THE DRAWINGS

FIG. 1 shows a block diagram of a stereo decoder of the prior art that blends an FM signal strength.

FIG. 2 shows the spectrum of frequencies that make up a standard FM stereo composite signal that typically appears at the output of the discriminator in an FM radio receiver.

FIG. 3 shows a simplified block diagram of an FM stereo decoder of this invention that blends on the noise near the 19 KHz pilot in the composite signal.

DESCRIPTION OF THE PREFERRED EMBODIMENTS

Figure 4:
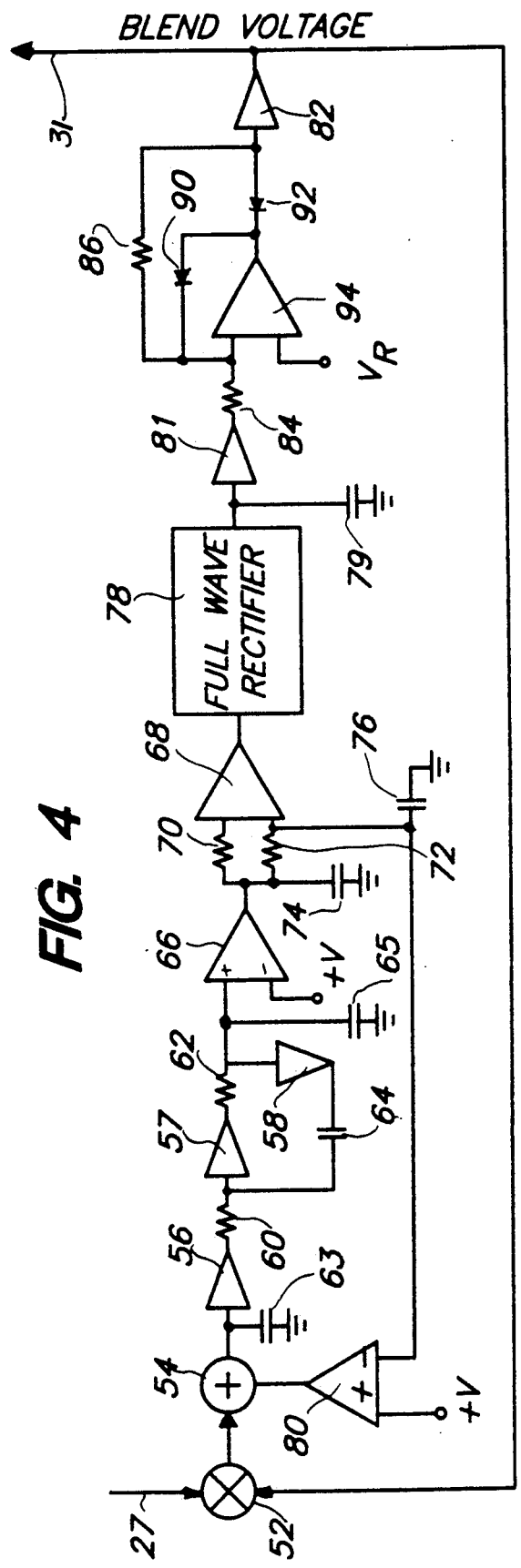
FIG. 4 shows a circuit diagram of the low pass filter and associated block circuitry employed in the blend signal generator portion of the decoder of FIG. 3.

In the preferred embodiments of this invention the decoder blends in direct relationship with the average amplitude of the noise existing within the frequency range within two kilohertz of the 19 KHz pilot component in a FM radio composite stereo signal such as is shown in FIG. 2.

That noise amplitude over about the 4 KHz range centered about the 19 KHz pilot is detected by the monitor means circuit portion 20 of the decoder shown in FIG. 3 that generates a blend-signal. Within this 4 KHz range centered about the 19 KHz pilot, transmitting stations are forbidden by law to transmit any signal except the pilot. Thus noise in this 4 KHz range is free of signals and there it is uniquely possible to detect noise only.

Generation of a blend voltage is accomplished by first AM demodulating the composite signal with reference to a local source of a 19 KHz signal which is phase shifted 90° relative to the pilot signal. This has the effect of eliminating the 19 KHz pilot from the demodulation product. That 4 KHz band of noise (two 2 KHz side band portions of composite signal) is demodulated and folded to within a frequency range of from 0 to 2 KHz. The demodulator shown in FIG. 3 is comprised of the two multipliers 22 and 24 and summing circuit 26 and has an output conductor 27. The demodulated signal at conductor Z7 is then passed through a low pass filter 28 having a bandpass of about 2 KHz thus eliminating higher frequency products derived from demodulated frequencies in the L+R and L−R signal bands of the composite signal.

The filtered noise is then detected in rectifier 30 to produce a voltage that is directly related to the average amplitude of the noise near the 19 KHz pilot. The output of the rectifier 30 produces at conductor 31 a blend voltage that is substantially proportional to the average amplitude of the 4 KHz pilot-band noise.

Still referring to FIG. 3, the circuit portion for decoding the composite signal and producing separate left and right stereo audio signals is a Walsh function type decoding circuit. Thirty-eight kilohertz Walsh signals W1 and W7 are introduced, respectively, via the multipliers 36 and 38 to the pair of mixers 40 and 42, respectively, in each of which pair the composite signal is AM demodulated and combined in summing network 44. Mixers 36 and 38 serve as blend-voltage controlled attenuators. The combination in FIG. 3 of the 19 KHz Walsh function signals W1/90° and W7/90° in the circuit composed of mixtures 22, 24 and adder 26 provides at conductor 27 the product of the composite signal and a 19 KHz stair stepped sine wave with essentially no odd harmonics.

The output of the summing network 44 is mixed with the composite signal in multiplier 46 to produce the left audio signal, and is mixed with the inverted composite signal in the multiplier 48 to produce the inverted right audio signal. The inverter 50 is of the analog kind providing 180° phase shift that may consist of a single amplifying transistor stage having a resistive load and with the output at the collector (not shown).

This particular decoding circuit might properly be called a Walsh L−R decoder. This arrangement of functional blocks 40, 42 and 44 is particularly useful as part of a receiver having FMX reception capability as will be shown. Alternatively, a simpler Walsh decoder producing left and right audio signals directly may be used in non-FMX receivers. Further, the even simpler non-Walsh decoder shown in FIG. 1, including L−R signal AM demodulating mixers 14 and 17, and adders 18 and 19 plus inverter block 20, may be used but such decoder circuits are prone to produce whistles or "birdies" if low cost square wave mixing oscillators (e.g. @ 38 KHz) are employed for mixing, since Walsh decoding eliminates the odd harmonics of the square wave that are essential to the generation of birdies.

Birdies will therefore not occur when a full four quadrant multiplier or decoder (17) is used with a pure 38 Khz sine wave oscillator (not shown) to demodulate the composite signal since that system does not produce odd harmonics. Sine wave filters or oscillators exclude harmonics but require large expensive tuning components and are thus avoided.

Figure 5:
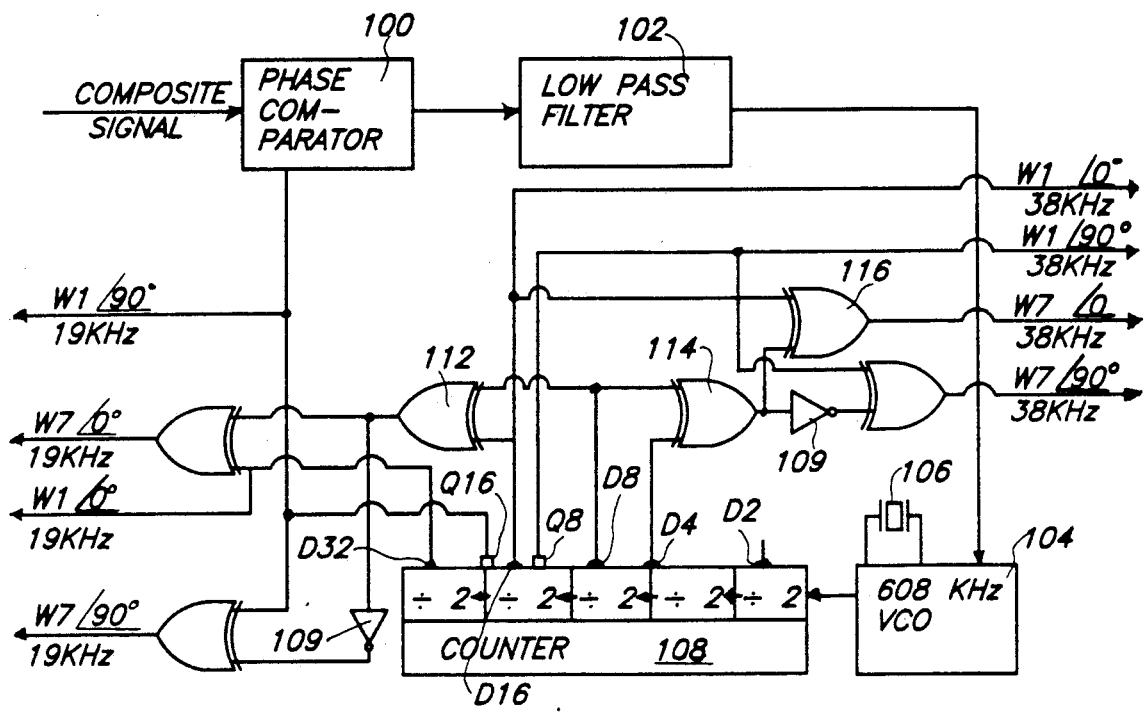
FIG. 5 shows a block diagram of the Walsh Function Generator employed in the decoder of FIG. 3.

The Walsh functions generator of FIG. 5 is a phase locked loop including a phase comparator 100, a low pass filter 102 and a voltage or current controlled oscillator (VCO) 104 that will free run at the natural frequency of a ceramic resonator 106; namely, at thirty-two times 19 KHz, or 608 KHz. A five bit binary counter 108 is connected to the output of the VCO 104, providing at five outputs D2, D4, D8, D16 and D32 square wave primary Walsh functions at their dominant frequencies 304 KHz, 152 KHz, 76 KHz, 38 KHz and 19 KHz, respectively. All these primary Walsh functions are locked in phase with the 19 KHz pilot in the composite signal, Wx/0°. Adjacent to outputs D16 and D32 are shown respectively square output terminals Q8 and Q16 at which square wave signals are produced of the same frequency but shifted 90° with respect to square wave signals at D16 and D32. Wx designations used in the drawings of these primary Walsh functions are defined in Table I below:

TABLE I

| Frequency | Terminal | Primary Walsh Function Signal Designations |
|---|---|---|
| 304 KHz | D2 | W16/0° F.$_p$ = W8/0° F.$_c$ |
| 152 KHz | D4 | W8/0° F.$_p$ = W4/0° F.$_c$ |
| 76 KHz | D8 | W4/0° F.$_p$ = W2/0° F.$_c$ |
| 38 KHz | D16 | W2/0° F.$_p$ = W1/0° F.$_c$ |
| 19 KHz | D32 | W1/0° F.$_p$ |
| 38 KHz | Q16 | W2/90° F.$_p$ = W1/90° F.$_c$ |
| 19 KHz | Q8 | W1/90° F.$_p$ |

$F_p$ is the pilot frequency, e.g. 19 KHz, and $F_c$ is the subcarrier frequency, e.g. 38 KHz.

By combining certain primary Walsh function signals in exclusive-or circuits 110, 112, 114, 116, 118 and 120 as shown in FIG. 5, Walsh functions W7/0° $F_p$, W7/0° $F_c$, W7/90° $F_p$ and W7/90° $F_c$; are produced. Properties of Walsh functions are described in the paper by J. L. Walsh, "A Closed Set of Normal Orthogonal Functions", American Journal of Math, Vol. 45, pp. 5-24 (1923). Generation and use of electrical Walsh function signals is described by Takahashi et al in the paper "Application of Walsh Functions to an FM Stereo Demodulator", Journal of Audio Engineering Society, Vol. 33, No. 9, September 1985. Walsh functions designated W1, W2, etc. as used herein are as defined as in the latter paper.

The 90 degree-phase-shifted Walsh function demodulator comprised of mixers (multipliers) 14 and 22, and summing circuit 26, shown in FIG. 3, advantageously demodulates the 19 KHz pilot to zero frequency and leaves no corresponding DC voltage in the demodulated output. This is an important feature in the "blend-on-noise" decoder of this invention because the pilot of even a weak FM radio signal usually contains much more energy than does the nearly 4 KHz band of noise which is relied upon here to effect the blending.

With reference to FIG. 4, that demodulated noise accompanied by all other demodulated portions of the composite signal, e.g. the L+R and L−R portions, subsequently enters via conductor 27 the multiplier 52 which serves as a gain control circuit. It then enters a two-pole low pass filter circuit made up of the summing network 54; three unity gain buffer amplifiers 56, 57 and 58; resistors 60 and 62; capacitors 63, 64 and 65; amplifier 66 with a gain of five, amplifier 68 with a gain of 2.2; resistors 70 and 72; and capacitors 74 and 76. The feedback amplifier 80 has a low gain, e.g. only slightly greater than unity, and provides control of the overall gain at DC as an alternative to adding an expensive AC coupling capacitor via two additional IC terminals.

The filter is followed by a full wave rectifier 78 and smoothing capacitor 79 which is followed in turn by a threshold circuit comprised of unity gain buffer amplifiers 81 and 82; resistors 84 and 86; operational amplifier 88; and diodes 90 and 92. As long as the noise related signal voltage at one differential input 94 of amplifier 88 is lower than the reference voltage $V_R$ applied to the other differential input 96 of amplifier 88, the blend voltage at output conductor 31 remains at a level too high to effect any blending via mixers 36 and 38 shown in FIG. 3. But when the voltage at amplifier input 96 exceeds the threshold voltage $V_R$, preferably set to occur when the L−R signal-to-noise ratio drops below about 35 db, the blend voltage decreases in proportion to increases in the detected noise, and blending is effected in direct proportion to increases in the detected noise whereby stereo separation diminishes toward the "monaural" listening mode. Component values for the blend voltage generating circuits are given in Table II.

TABLE II

| RESISTORS | CAPACITORS |
|---|---|
| 60 25K ohm | 63 0.8 nf |
| 62 25K | 64 3.3 nf |
| 70 50K | 65 3.3 nf |
| 72 50K | 74 3.3 nf |
| 84 1K | 76 10.0 uf |
| 86 10K | 79 30.0 uf |

Figure 6:
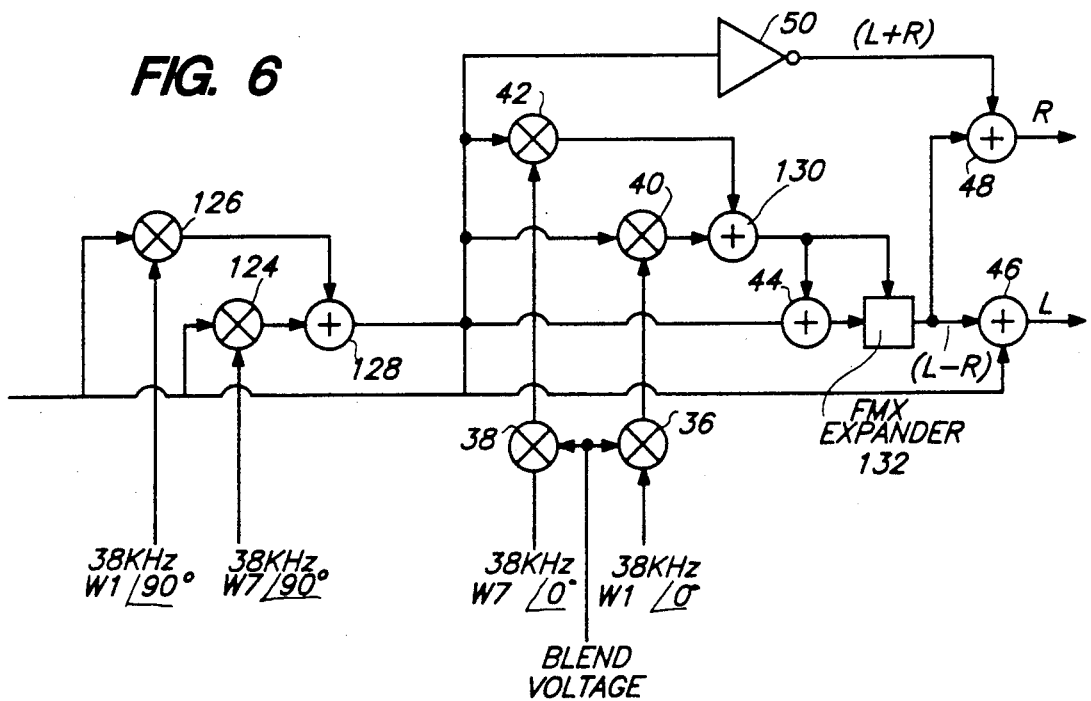
FIG. 6 shows the decoding circuit portion of the decoder of FIG. 3 modified for FMX stereo separation and blending.

The decoding circuit of FIG. 6 shows all of the components of the decoding circuit of FIG. 3 plus 90° shifted mixers 124 and 126, summing networks 128 and 130, and an FMX expander 132.

The summing networks 128 and 44 may be combined as one three-input summing network. Beyond such simple modification, the preferred decoding circuits shown in FIGS. 3 and 6 are representative of many that can be constructed for Walsh-function decoding and this invention would broadly encompass all such alternative decoding circuits. Neither do the inventors hereof wish to be limited by the particular blend-voltage-generation-circuit shown in FIG. 4 for which there are various logic-circuit alternatives.

In the preferred embodiment described here, the decoders are designed to specifically handle FM-radio transmissions, namely FM modulated transmissions with a composite signal in which the pilot and sub-carrier are 19 KHz and 38 KHz, respectively. This invention is however intended to encompass FM stereo TV transmissions, e.g. in which pilot and sub-carrier are at 15.75 KHz and 31.00 KHz, respectively, and FM radio data transmissions wherein the pilot and sub-carrier are at yet other harmonic related frequencies.

The decoder described herein above has been made as an integrated silicon circuit chip, using external discrete capacitors. The integrated circuit includes bipolar transistors and CMOS transistors. The Walsh function generator of this embodiment is implemented in CMOS circuitry occupying a very small area of the chip, whereas substantially all of the other circuits employ bipolar transistors. Such BiMOS integrated circuits of the prior art are described in Zunino U.S. Pat. No. 4,646,124 issued Feb. 24, 1987, Miles et al U.S. Pat. No. 4,225,877 issued Sept. 30, 1980 and in patent application Ser. No. 07/281,593 filed Dec. 9, 1988. These three references are assigned to the same assignee as is the present invention.

More detailed description relating to the operation of standard FM-and FMX-capable receivers under multipath conditions is provided in the patent application to T. Field and O. Richards entitled *FM Stereo Tone Detector* and the application by O. Richards entitled *Stereo Decoder With Variable Bandpass*. Both applications are assigned to the same assignee as is the present invention and both applications were filed concurrently with the present application.

What is claimed is:

1. An FM stereo decoder of the kind comprising a composite signal conductor adapted for carrying a standard stereo composite signal containing a pilot signal, and a stereo decoding circuit means connected to said composite signal conductor for demodulating the composite signal and generating separate left and right stereo audio signals and including a blend-control means with a blend-control signal input for changing the degree of separation of the left and right audio signals as a function of the level of a signal applied to said blend-control input, said decoder additionally comprising:

a first generating means for generating at least a first signal having a dominant frequency component equal to the frequency of the pilot signal component in the composite signal; and a noise monitor means connected to said composite signal conductor and to said first generating means for producing at a noise-monitor-means output a noise-indication signal of amplitude that is related to the magnitude of the noise in the composite stereo signal within a narrow frequency band near the pilot signal component in the composite signal, the output of said noise monitor means connected to said blend-control means input so that blending and the changing of the separation of the left and right signal is a function of the magnitude of the noise near the pilot signal component in the composite signal, said noise monitor means comprises a noise demodulator means connected to said composite signal conductor and to said generating means for mixing said composite and first signal to transform said narrow frequency band of the composite signal to a demodulated noise-containing band the lower end of which is at zero frequency, a multiplier having one input connected to the output of said noise demodulator means; and a low pass filter having about half the band width of said noise containing frequency band, the input of said filter connected to the output of said multiplier; a rectifier connected between the output of said low pass filter and said blend-control input; the other input of said multiplier being feed-back connected to the output of said noise demodulator means for stabilizing and controlling the gain of said noise monitor means.

2. The FM stereo decoder of claim 1 wherein said generating means is additionally for generating the at least one signal with a phase of 90° with respect to the pilot signal component of the composite signal for eliminating the pilot signal from the output of said monitor mixing means.

3. The FM stereo decoder of claim 2 wherein said at least one signal is a primary W1/90° Walsh function signal with reference to the pilot frequency and said generating means is additionally for generating a second signal that is a W7/90° $F_p$ Walsh function with reference to the pilot frequency $F_p$, and wherein said monitor mixing means is a Walsh type mixer for combining said W1/90° $F_p$ and W7/90° $F_p$ signals with said composite signal to obtain the demodulated noise-containing band.

4. The FM stereo decoder of claim 2 wherein said standard stereo composite signal includes an (L+R) band of frequency spaced apart from an (L−R) band known as the S-band of higher frequencies, a pilot signal of frequency $F_p$ centered in the space between the (L+R) and (L−R) bands, the (L−R) band comprised of two AM side bands about a suppressed sub-carrier frequency $F_c$ twice that of the pilot signal frequency $F_p$; and wherein said signal generating means is additionally for generating the in phase Walsh function signals W1/0° $F_p$ and W7/0° $F_p$ with reference to the pilot frequency $F_p$ and for generating the additional Walsh function signals W1/90° $F_c$, W7/90° $F_c$, W1/0° $F_c$ and W7/0° $F_c$; said stereo decoding circuit means comprising a first dual channel Walsh type mixer with the primary input coincident with said stereo-decoding-circuit-means input and with the two ancillary inputs connected to points in said signal generating means at which respectively the W1/0° $F_c$ and W7/0° $F_c$ are generated.

5. The FM stereo decoder of claim 4 wherein said blend-control means comprises a voltage controlled attenuator having two signal channels connected interposed between said two ancillary inputs of said first Walsh type mixer and said signal-generating-means points at which said W1/0° $F_p$ and W7/0° $F_p$ and are generated, said voltage controlled attenuator having an attenuation-control input that is coincident with said blend-control input of said blend-control means.

6. The FM stereo decoder of claim 4 wherein said standard stereo composite signal is a standard FMX signal that further includes another (L−R) band of frequencies known as the S'-band that is shifted 90° from the S-band relative to the sub-carrier, said stereo decoding circuit means further comprising a second dual channel Walsh type mixer with the primary inputs connected to said input conductor with the two ancillary inputs connected to points in said signal generating means at which the Walsh signals W1/90° $F_c$ and W7/90° $F_c$ are generated, said stereo decoding circuit means further comprising a signal summing means for adding the signals at the two outputs of said first dual channel Walsh type mixer, for adding the signals at the two outputs of said second dual channel Walsh type mixer and for adding the added outputs of said first and second Walsh type mixers at a summing means output so that a blendable composite demodulated L−R signal is generated there.

7. The FM stereo decoder of claim 6 wherein said stereo decoding circuit means further includes an FMX expander circuit to which said summing means output is connected.

8. The FM stereo decoder of claim 1 being adapted for incorporation in an FM radio that generates a composite signal wherein the pilot has a frequency $F_p$ of 19 KHz and said narrow frequency band extends over about a 4 kilohertz band centered about the FM-radio-19 KHz-pilot signal.

* * * * *